UNITED STATES PATENT OFFICE 2,628,967

PROCESS FOR THE PREPARATION OF PARTIAL ESTERS OF POLYHYDRIC ALCOHOLS WITH CARBOXYLIC ACIDS

Roland-Carlo Voegeli, Cointrin, Switzerland, assignor to The Givaudan Corporation, a corporation of New Jersey No Drawing. Application November 13, 1948, Serial No. 59,972

15 Claims. (Cl. 260—410.7)

This invention relates to improved processes for the preparation of partial esters of polyhydric alcohols with carboxylic acids, especially partial esters of glycerol.

The partial esters of glycerol, i. e., the monoglycerides and diglycerides, have found considerable use in recent years on account of their properties, which differ considerably from those of the complete esters, i. e., the triglycerides. Thus, for example, the partial esters can be emulsified with great facility and give rise to emulsions of remarkable stability. As a result, these partial esters are employed in many preparations where emulsions are necessary or desirable, especially in the cosmetic, finishing, dye and nutrition fields, and the like.

I am aware that it is already known to prepare the aforementioned partial esters by different methods, depending on the starting materials used. Thus, one may effect a direct esterification by heating a carboxylic acid and a polyhydric alcohol, eliminating the water of condensation by suitable means. The reaction may be facilitated by employing solvents for the acid and alcohol used, or by using catalysts such as salts of the alkali metals, zinc, tin, aluminum, etc.

The aforementioned partial esters may also be prepared by processes involving partial saponification of the complete esters by means of a polyhydric alcohol.

In either case the reaction gives rise to a mixture of monoesters and polyesters, in varying proportions.

I have found that by the use of certain catalysts the aforementioned reactions can be conducted so as to favour the formation of the monoesters, whereas in the absence of these catalysts the reaction generally proceeds so as to favour the formation of the diesters.

The catalysts which have been found to yield the indicated desired results are those metals which are capable of possessing different valences in compounds. Examples of such metals are iron, nickel, chromium and manganese. Those metals which can easily pass from one valence to another are, in the form of their carboxylic acid salts, especially suitable for the purposes of this invention. Examples of these latter metals are iron, manganese and cobalt. Among the specific catalysts which have been employed herein may be mentioned: ferric acetate, ferric stearate, iron oxides, iron powder, chromic stearate, manganous stearate and cobaltous stearate.

The conditions under which my improved process may be conducted may be varied quite widely.

For satisfactory results I have found it desirable to employ an excess of glycerol over the theoretical amount, an excess of 25 percent in the case of the direct esterification and an excess of 40 percent in the case of the partial saponification being especially satisfactory. Elevated temperatures from about 180° C. to about 270° C. are used, temperatures between about 180° C. and 220° C. giving excellent results in the direct esterification and temperatures between about 260° C. and 270° C. being especially suitable in the partial saponification. The time of the reaction will depend, inter alia, upon the reactants and the temperature. It has been found that one hour is generally sufficient for the direct esterification and four hours gives satisfactory results in the partial saponification.

Side reactions such as oxidations may be minimized by conducting my process in an atmosphere of inert gas, such as carbon dioxide or nitrogen. The reaction may be facilitated by violent agitation of the reaction mixture.

It will be understood that the use of the aforementioned catalysts is not to be understood as excluding the simultaneous use of other known means or catalysts for facilitating the desired reaction.

It will also be understood that it is not necessary to use the catalysts in the form of their salts. They may also be used in the form of their oxides or in the metallic state.

In order more fully to describe my invention, the following examples are given. They are for purposes of illustration and are not intended as limitations on the scope of my invention.

In conducting the experiments to be described, the following procedures were followed. In the direct esterifications, the fatty acid, the polyhydric alcohol and the catalyst were introduced into a three-necked Keller flask of 750 cc. capacity, the flask being provided with a thermometer, a porcelain agitator, hydraulic seal, and a delivery tube leading to a small tared flask itself provided with a cooling medium. In order to eliminate oxidation and browning the air in the apparatus was replaced with an inert gas nitrogen or carbon dioxide. The products were heated under sufficient agitation to intimately mix the two layers which are immiscible when cold and at temperatures generally under 200° C. In thirty to forty-five minutes the temperature rose to 220° C. to 240° C. and was maintained thereat for half an hour in order to remove the water formed. After cooling, the oily liquid quickly congealed. It was separated from the excess of polyhydric alcohol by decantation, taken up with boiling benzene and washed twice with hot brine, followed by drying over anhydrous sodium sulfate and evaporation of the benzene over a steam bath.

In the saponification method of obtaining the partial esters, the process and apparatus is substantially the same, the delivery tube and receiving flask serving to recover polyhydric alcohol entrained by the inert gas and by a little water formed by secondary reactions which occur during the operation. The temperature employed is somewhat higher than in the direct esterification and the time of reaction is somewhat greater also.

Example 1

300 parts of stearic acid, 140 parts of glycerol 85% and 0.54 part of ferric stearate (obtained by the precipitation of an aqueous solution of potassium stearate with a solution of ferrous sulfate, filtering and air oxidation of the filtered precipitate) are heated together under the above mentioned conditions. At about 160–170° C., the water formed by the reaction begins to distill. It must be progressively heated, the temperature being increased to 230–240° C. and maintained there at for half an hour. There is distilled in all 40 to 45 parts of water containing a slight amount of primed glycerol. The total time of heating is about 2 hours. After being allowed to cool, the ferric salt is eliminated by filtration, the filtrate treated with 1000 parts of boiling benzene, washed twice with 200 parts of brine, giving about 370 to 380 parts of a white waxy product having the following characteristics: congealing point, 55° C.; acid number, below 3; hydroxyl value, 210–220.

Glyceryl monostearate constitutes the main part of the product. Yield, about 95% of the theory.

Example 2

282 parts of commercial oleic acid, 115 parts of pure glycerol and 0.5 part of manganous stearate are heated together under the conditions described, to a temperature of 240° C., maintained for about 30 minutes. The total time of heating is about 2 hours, and about 18 parts of water are distilled. After cooling, the excess glycerol is separated by decantation, the oily substance is dissolved in 1000 parts of toluene, washed twice by 200 parts of brine and the toluene is then drawn off by distilling. There is obtained about 340 parts of an oily product, light brown, chiefly constituted by glyceryl monooleate. (Acid number, below 3; hydroxyl value, 205–220.)

Yield, about 90% of the theory.

Example 3

A mixture of 200 parts of fatty acids formed by the saponification of coconut oil and 100 parts of ethylene glycol was heated at a temperature around 200° C. in the presence of one part of cobaltous carbonate and three parts of potassium laurate. The reaction was finished after 4 hours of heating, the reaction mixture was then cooled and the unreacted ethylene glycol as well as the salts of cobalt and potassium were removed by filtration and washing with brine. There was obtained 240 parts of a product which consisted mainly of ethylene glycol monoesters with some free coconut fatty acids.

Example 4

A mixture of 440 parts of oil of sweet almonds (acid number=0, ester number=192, hydroxyl value=0) with 130 parts of pure glycerol and 5 parts of iron stearate (obtained by the precipitation of an aqueous solution of potassium stearate with a ferrous sulfate solution and subsequent air oxidation) was heated for six hours at a temperature around 260° C. After cooling the reaction mixture, the excess of glycerol and the iron salt were eliminated. There was obtained about 500 parts of an oily substance (acid number=0, ester number=172 and hydroxyl value=250) which consisted of about 175 percent of glyceryl monooleate.

Example 5

A mixture of 400 parts of olive oil, 100 parts of glycerol, 5 parts of cobaltous stearate and 120 parts of glyceryl monooleate as above prepared was heated under the same conditions given in the preceding example. After the reaction mixture was cooled the unreacted glycerol and the cobalt salt were removed. An oily body having a hydroxyl value of about 245 and consisting principally of the monooleate of glycerol was obtained.

Yield, about 95% of the theory.

Example 6

A mixture of 450 parts of hydrogenated cotton oil (iodine value less than 5), 110 parts of pure glycerol, 2 parts of ferric decylate and 3 parts of potassium stearate was heated to 250° C. for five hours in a nitrogen atmosphere and under violent agitation. After cooling the reaction mixture the unreacted glycerol and the iron and potassium salts were removed. A waxy mass having a hydroxyl value of about 240 and consisting principally of the monostearate of glycerol was obtained.

Yield, about 97% of the theory.

The foregoing illustrates my invention, which however is not to be limited thereby but is to be construed as broadly as permissible in view of the prior art and limited solely by the appended claims.

I claim:

1. A process for preparing partial carboxylic acid esters of polyhydric alcohols, which comprises heating glycerol and a member selected from the group consisting of higher fatty acids and higher fatty acid polyesters at an elevated temperature, in the presence of at least one catalyst selected from the group consisting of metals having atomic numbers between 24 and 28, inclusive in Series 4 of the periodic table which are capable of possessing more than one valence in their compounds and the salts of said metals.

2. A process for preparing partial carboxylic acid esters of polyhydric alcohols, which comprises heating glycerol and a member selected from the group consisting of fatty acids and fatty acid polyesters at a temperature within the range from about 180° to 270° C., in the presence of an iron soap as a catalyst.

3. A process for preparing partial carboxylic acid esters of polyhydric alcohols, which comprises heating glycerol and a member selected from the group consisting of fatty acids and fatty acid polyesters at a temperature within the range from about 180° to 270° C., in the presence of an iron compound as a catalyst.

4. A process for preparing partial carboxylic acid esters of polyhydric alcohols, which comprises heating glycerol and a member selected from the group consisting of fatty acids and fatty acid polyesters at a temperature within the range from about 180° to 270° C., in the presence of iron as a catalyst.

5. A process for preparing partial esters of glycerol, which comprises heating glycerol and a higher fatty acid triglyceride at a temperature within the range from about 180° to 270° C. in the presence of at least one catalyst selected from the group consisting of metals having atomic numbers between 24 and 28, inclusive in Series 4 of the periodic table which are capable of possessing more than one valence in their compounds and the salts of said metals.

6. A process for preparing partial esters of glycerol, which comprises heating glycerol and a higher fatty acid triglyceride at a temperature within the range from about 180° to 270° C. in the presence of an iron soap as a catalyst.

7. A process for preparing partial esters of glycerol, which comprises heating glycerol and a higher fatty acid triglyceride at a temperature within the range from about 180° to 270° C. in the presence of iron as a catalyst.

8. A process for preparing partial esters of glycerol, which comprises heating glycerol and a higher fatty acid at a temperature within the range from about 180° to 270° C. in the presence of an iron soap as a catalyst.

9. A process for preparing partial esters of glycerol, which comprises heating glycerol and a higher fatty acid at a temperature within the range from about 180° to 270° C. in the presence of iron as a catalyst.

10. A process for preparing partial esters of glycerol, which comprises heating glycerol and stearic acid at a temperature within the range from about 180° to 270° C., in the presence of ferric stearate as a catalyst.

11. A process for preparing partial esters, which comprises heating ethylene glycol and coconut oil fatty acids at a temperature within the range from about 180° to 270° C., in the presence of cobaltous carbonate as a catalyst.

12. A process for preparing partial esters of glycerol, which comprises heating glycerol and oil of sweet almonds at a temperature within the range from about 180° to 270° C., in the presence of ferric oleate as a catalyst.

13. A process for preparing partial esters of glycerol, which comprises heating glycerol and olive oil at a temperature within the range from about 180° to 270° C., in the presence of cobaltous stearate as a catalyst.

14. A process for preparing partial esters of glycerol, which comprises heating glycerol and hydrogenated cottonseed oil at a temperature within the range from about 180° to 270° C., in the presence of ferric decylate as a catalyst.

15. A process for preparing partial carboxylic acid esters of polyhydric alcohols, which comprises heating a polyhydric alcohol and a member selected from the group consisting of higher fatty acids and higher fatty acid polyesters at an elevated temperature, in the presence of at least one catalyst selected from the group consisting of metals having atomic numbers between 24 and 28, inclusive in Series 4 of the periodic table which are capable of possessing more than one valence in their compounds and the salts of said metals.

ROLAND-CARLO VOEGELI.

REFERENCES CITED

The following references are of record in the file of this patent:

UNITED STATES PATENTS

| Number | Name | Date |
|---|---|---|
| 2,022,494 | Christensen | Nov. 26, 1935 |
| 2,384,793 | Bruun | Sept. 18, 1945 |

OTHER REFERENCES

Dean: Utilization of Fats, Chemical Pub. Co., New York, New York, 1938, pages 118–119.

Berkman et al.: Catalysis, page 193, Reinhold Pub. Co., 1940.